No. 778,667.  Patented December 27, 1904.

UNITED STATES PATENT OFFICE.

ELIJAH MARK HOUGHTON, OF DETROIT, MICHIGAN.

BLACKLEG-VACCINE AND PROCESS OF MAKING SAME.

SPECIFICATION forming part of Letters Patent No. 778,667, dated December 27, 1904.

Application filed February 6, 1902. Serial No. 92,827.

*To all whom it may concern:*

Be it known that I, ELIJAH MARK HOUGHTON, a citizen of the United States, residing at Detroit, in the county of Wayne and State of Michigan, have invented certain new and useful Improvements in Blackleg-Vaccine and Processes of Making the Same, of which the following is a specification.

The invention relates to improved vaccine for blackleg and the process of making the same, all as more fully hereinafter described, and particularly pointed out in the claims.

In making my blackleg-vaccine I preferably proceed as follows:

I take the muscles from the affected areas of a heifer having died from blackleg and chop or grind the same—such, for instance, as in the ordinary meat-chopper—and then dry the same, for instance, by spreading a thin layer and drying at a temperature at, say, 32° to 35° centigrade. When dried, this muscle tissue is then powdered or ground by any suitable apparatus. I next attenuate the virus, and to do this I mix the powdered muscles or virus with distilled water—say about five hundred cubic centimeters of distilled water to two hundred and fifty grams of the powdered virus. This mixture I spread in small dishes and attenuate for about six hours at from 80° to 100° centigrade, according to the strength of virus desired. The attenuated virus is then powdered and sifted, preferably through silk cloth. The finer particles which sift through the cloth are next mixed with a protein, preferably normal cow serum—that is, the serum part of the blood of a normal unvaccinated cow—which is in the form of a dried powder. To do this, I dissolve five grams of dried normal cow serum in twenty-five cubic centimeters of distilled water and add to this twelve grams of the powdered and attenuated virus and make a mass as quickly as possible. This mass is then formed into pills in any desired manner, and these pills are then heated at from 60° to 70° centigrade and then at an attenuating temperature of from 80° to 100° centigrade for two hours longer, when they are ready for use. The pills are used by forcing them beneath the skin of the animal by any suitable instrument in any known and desired manner.

In place of using the normal cow serum as an excipient I may use other substances, such as the white of eggs, for instance, or even gelatin, these all coming under, as I understand it, the general term "protein."

Instead of powdering and sifting dry through silk cloth before the cow serum is added, as hereinbefore set forth, I may obtain the finer particles from the coarser particles by any other known method of separation. For instance, I may mix the powdered virus with water and then separate by filtration or straining through suitable medium, such as cotton cloth. Of course in that case the fluid will have to be separated from the powdered material by sedimentation, evaporation, or filtration before the cow serum is added.

I find that the cow serum is by far the most satisfactory excipient which can be used satisfactorily with the virus.

The second heating, which may be carried out after the virus is packed in the bottles ready for sale, is for the purpose of giving the product the desired strength, since during the process of manufacture, owing to the presence of moisture, the virulence of the virus is liable to have increased.

What I claim as my invention is—

1. The herein-described process of making blackleg-vaccine, which consists in powdering the dried muscles obtained from an animal infected with blackleg, attenuating the virus by heat, separating the finer particles from the coarser, mixing said finer particles with a protein substance and subjecting the weakened virus to a second heating and dried.

2. A dry attenuated vaccine containing the finer particles of muscles of infected animals mixed with normal serum and dried.

3. A dry attenuated vaccine containing the finer particles of muscles of infected animals mixed with a normal cow serum and dried.

4. A heat-attenuated vaccine containing the finer particles of muscles of animals infected with blackleg mixed with normal serum and dried.

5. A heat-attenuated vaccine containing the finer particles of muscles of animals infected with blackleg mixed with normal cow serum and dried.

6. The herein-described blackleg-vaccine consisting of a product obtained from the dry muscles of an animal infected with blackleg, which product has been heat-attenuated and mixed with normal cow serum; the product being again attenuated and caused to be of known and uniform verity and dried.

7. The herein-described process of making blackleg-vaccine, which consists in powdering the dry muscles obtained from an animal infected with blackleg, attenuating the virus and separating the finer particles from the coarser, mixing said finer particles with a protein substance and finally subjecting the weakened virus to a second attenuation and dried.

In testimony whereof I affix my signature in presence of two witnesses.

ELIJAH MARK HOUGHTON.

Witnesses:
  M. B. O'DOGHERTY,
  H. C. SMITH.